United States Patent
Vellinga

(10) Patent No.: US 7,083,729 B2
(45) Date of Patent: Aug. 1, 2006

(54) DEVICE AND METHOD FOR CLEANING A FLUID, SUCH AS WATER

(75) Inventor: Sjoerd Hubertus Josef Vellinga, Tjalleberd (NL)

(73) Assignee: Paques B.V., El Balk (NL)

( * ) Notice: Subject to any disclaimer, the term of this patent is extended or adjusted under 35 U.S.C. 154(b) by 235 days.

(21) Appl. No.: 10/432,333

(22) PCT Filed: Nov. 23, 2001

(86) PCT No.: PCT/NL01/00857

§ 371 (c)(1),
(2), (4) Date: Nov. 20, 2003

(87) PCT Pub. No.: WO02/41980

PCT Pub. Date: May 30, 2002

(65) Prior Publication Data

US 2005/0115891 A1    Jun. 2, 2005

(30) Foreign Application Priority Data

Nov. 24, 2000    (NL) .................................... 1016705

(51) Int. Cl.
*C02F 3/00*    (2006.01)
(52) U.S. Cl. ..................... 210/620; 210/767; 210/791; 210/797; 210/220; 210/359; 210/391; 210/393; 210/406; 210/410; 210/416.1; 210/500.41; 210/500.27
(58) Field of Classification Search ................ 210/620, 210/767, 791, 797, 220, 359, 391, 393, 406, 210/410, 416.1, 500.41, 500.27
See application file for complete search history.

(56) References Cited

U.S. PATENT DOCUMENTS

| 3,309,301 | A | | 3/1967 | Kollsman |
| 4,765,906 | A | * | 8/1988 | Downing et al. ........... 210/636 |
| 5,482,625 | A | * | 1/1996 | Shimizu et al. ......... 210/321.84 |
| 6,274,035 | B1 | * | 8/2001 | Yuan et al. .................. 210/150 |
| 6,863,818 | B1 | * | 3/2005 | Daigger et al. ............. 210/616 |

FOREIGN PATENT DOCUMENTS

| JP | 4-18923 | 1/1992 |
| JP | 6-210144 | 8/1994 |
| JP | 7-88337 | 4/1995 |
| JP | 9-155166 | 6/1997 |
| JP | 10-66843 | 3/1998 |

* cited by examiner

*Primary Examiner*—Chester T. Barry
(74) *Attorney, Agent, or Firm*—Young & Thompson

(57) ABSTRACT

A device for cleaning a fluid comprises at least one set of a first membrane cloth and a second membrane cloth, each being permeable to water over substantially their entire length. The membrane cloths are held taut, substantially parallel to one another in a frame delimiting between them a movement path for fluid. The cloths are displaceable with respect to one another between a first position, in which the mutually facing surfaces substantially touch one another, and a second position, in which the cloths lie at a distance from one another and the width of the movement path for the fluid is greater than in the first position. At least one of the cloths, on the side which faces towards the adjacent cloth is provided with grooves or webs for the purpose of forming channels between the cloths in the longitudinal direction of the cloths, in the first position.

20 Claims, 5 Drawing Sheets

DEVICE AND METHOD FOR CLEANING A FLUID, SUCH AS WATER

The invention relates to a device, in particular suitable for cleaning a fluid, such as water, comprising at least one set of a first membrane cloth and a second membrane cloth, each being permeable to water over substantially their entire length, which membrane cloths are held taut, substantially parallel to one another in a frame, the membrane cloths between them delimiting a movement path for fluid, the cloths being displaceable with respect to one another between a first position, in which the mutually facing surfaces substantially touch one another, and a second position, in which the cloths lie at a distance from one another and the width of the movement path for the fluid is greater than in the first position.

An invention of this type is known in the prior art. For the biological purification of wastewater, increasing use is being made of what are known as membrane bioreactors (MBR). A reactor of this type comprises an aerated tank containing microorganisms which use the contamination in the wastewater as food. Moreover, a reactor of this type comprises a membrane installation which generally consists of microfiltration modules. The membranes are used to separate the bacteria from the purified water and to return these bacteria to the reactor tank. Membrane modules which act using a vacuum can also be suspended in an aerated tank. Suspending the membrane modules in the aerated tank means that they do not take up any additional space. Moreover, in the tank there are generally means for generating a stream of bubbles. These means are generally positioned beneath the membranes. With the aid of the air bubbles, the membranes are made to vibrate and shear forces are formed on the surface of the membranes, so that it is impossible for impurities to stick to the membrane material. Despite the cleaning action of the rising air bubbles, it is also necessary from time to time to clean the inside of the membranes, for example by means of a solution of chemicals.

A device of the above type is known, inter alia, from International Patent Application WO 98/46533 (Zenon). This publication has disclosed a device which uses membranes which comprise hollow fibres with a thickness of a few millimeters. Large numbers of the hollow fibres are secured at their ends in a module. The maximum length of these fibres is approximately one-and-half to two meters. As a result of the hollow fibres being tied together, "bundles of spaghetti" are formed. In practice, these bundles of spaghetti are difficult to handle. Furthermore, the length of the fibres is limited in view of the strength of the individual attachment of the fibres. A further drawback of the device according to this publication is that a high pressure is required for the cleaning with the aid of chemicals, since the fibres will exert a relatively high resistance to the flow of chemicals.

U.S. Pat. No. 5,482,625 has disclosed a device of the type described in the preamble in which, instead of hollow fibres, frameworks which are secured in modules are used. Membrane cloth is glued to these frameworks. A vacuum can be generated between the membrane cloths, water being guided out of the tank through the membrane cloths towards an outlet. The membrane cloths are stuck to frameworks in order to prevent the membrane cloths from coming into contact with one another under the influence of the vacuum, making it impossible for any further fluid to be transferred between these membrane cloths. The drawback of the system according to the abovementioned U.S. Patent is that a very large number of frameworks are required for the purpose of securing the membrane cloths, making the system expensive.

The object of the present invention is to provide a device of the type mentioned in the preamble which as far as possible avoids the drawbacks of the system according to the prior art.

According to the invention, this object is achieved by the fact that at least one of the cloths, on the side which faces towards the adjacent cloth, is provided with grooves or webs for the purpose of forming channels between the cloths in the longitudinal direction of the cloths, in the first position of the membrane cloths.

According to a preferred embodiment, it is possible for the grooves or webs to be formed by ribs which extend in the longitudinal direction of the cloth.

The fact that the cloths can move slightly with respect to one another and will bear against one another under the influence of a vacuum means that, on account of the presence of the ribs, fine channels are formed between the two cloths, forming the movement path for the fluid which is to be cleaned. The framework in which the cloths are arranged is open on the underside and at the top side, so that the air bubbles can also rise through the framework. As a result, a cleaning action is effected through the cloths.

In a particularly preferred embodiment, grooves or webs are arranged in both the first membrane cloth and the second membrane cloth, the grooves or webs of the cloths being positioned in such a manner that the grooves in the first cloth together with the grooves in the second cloth enclose a channel between the cloths, in the first position of the membrane cloths.

If the membrane cloths are positioned against one another two-by-two in a mirror-symmetrical manner, the vacuum which is applied between the two cloths and presses the cloths against one another leads to fine channels being formed. These channels are formed when the hollow sides of the grooves or passages in the cloths adjoin one another.

One of the major advantages of the system according to the present invention is that it is possible to provide a large number of very fine channels with the aid of membrane cloths. This means that there is no need to use the "bundles of spaghetti" which are difficult to handle and have been discussed above in connection with the prior art. Moreover, the length of the membrane cloths is in principle unlimited.

A further advantage is that a cleaning fluid can, for example, be pumped in the reverse direction between the membrane cloths. This results in an excess pressure between the membrane cloths, with the result that the cloths will move apart. As a result of the cloths moving apart, the resistance of the membrane cloths to the flow of cleaning medium along the cloths is reduced, and the cleaning liquid can successfully enter the channels or grooves arranged in the membrane cloths. The excess pressure which can be exerted on the cloths is, for example, 0.5 meter water column.

According to the invention, it is possible for the membrane cloths to comprise polyester fibre. Furthermore, it is possible for the polyester fibre to be coated with a top layer of polysulphone, such as for example polyethersulphone. The cloth can be produced, for example, from a polyester fibre as substrate material, with a thickness of 0.5 millimeter. A top layer can then be applied to this substrate material, for example 0.25 millimeter of polysulphone. This material is relatively strong, and consequently relatively long distances between the ends of a frame are possible. This means that it is possible to use higher modules than would be the case with the hollow fibres (bundles of spaghetti) discussed above.

The water moves through the top layer of polysulphone in order for microorganisms and other particles to be separated out of the water. The water then passes into the supporting polyester fibre layer. This layer ensures that the water is transported towards the movement path between two adjacent membrane cloths.

To prevent the cloths from being pushed too far apart during the cleaning of the cloths with a cleaning liquid, supporting walls may be arranged at the side of the cloths, in order to prevent the space between the cloths from becoming too large.

As has already been pointed out above, it is advantageous if, in the device according to the present invention, there are means for forming a stream of bubbles along the membrane cloths. These means are preferably positioned on the underside of the frame in which the membrane cloths are secured.

The presence of the stream of bubbles will make the membrane cloths vibrate, which means that impurities which have adhered to the membrane cloth can be detached from the membrane cloths.

In a second aspect, the present invention also relates to membrane cloth, in particular suitable for a device according to the invention, in which the membrane cloth is provided with ribs for forming channels between the membrane cloth and a second cloth which is to be placed against the surface of the membrane cloth.

The invention also relates to a method for the biological cleaning of wastewater, in which
  the wastewater is purified with the aid of microorganisms which are present in an aerated tank,
  the purified water is passed along a membrane, for the purpose of separating particles, such as microorganisms, out of the purified water, the purified water being forced through a fluid path with the aid of a vacuum, which fluid path is enclosed between a first membrane cloth and a second membrane cloth.

The method according to the present invention is characterized in that the first membrane cloth and the second membrane cloth are arranged displaceably with respect to one another, in such a manner that the first membrane cloth and the second membrane cloth are moved substantially towards one another by forcing the flow of purified water between the membrane cloths.

As has already been pointed out above, it is advantageous for the first and second membrane cloths to be arranged displaceably with respect to one another, in such a manner that the first membrane cloth and the second membrane cloth are moved substantially towards one another by sucking water up between the membrane cloths with the aid of a pump.

Moreover, it is advantageous for a cleaning liquid then to be forced through the fluid path between the first and second membrane cloths with the aid of an excess pressure.

The present invention will be explained further with reference to the appended figures, in which.

Figure 1:
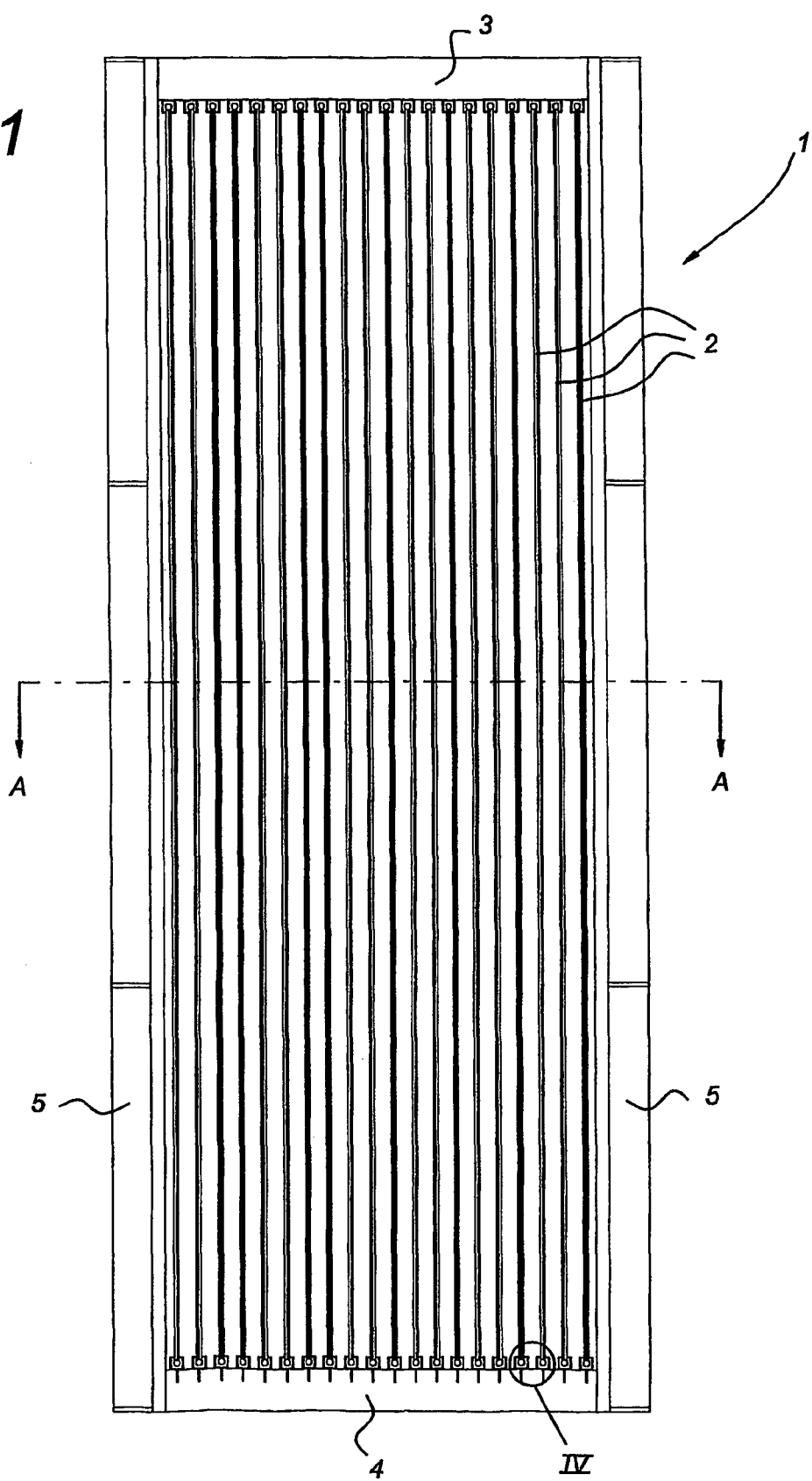
FIG. 1 shows a front view of a frame in which a plurality of sets of in each case two membrane cloths are arranged.
Figure 4:
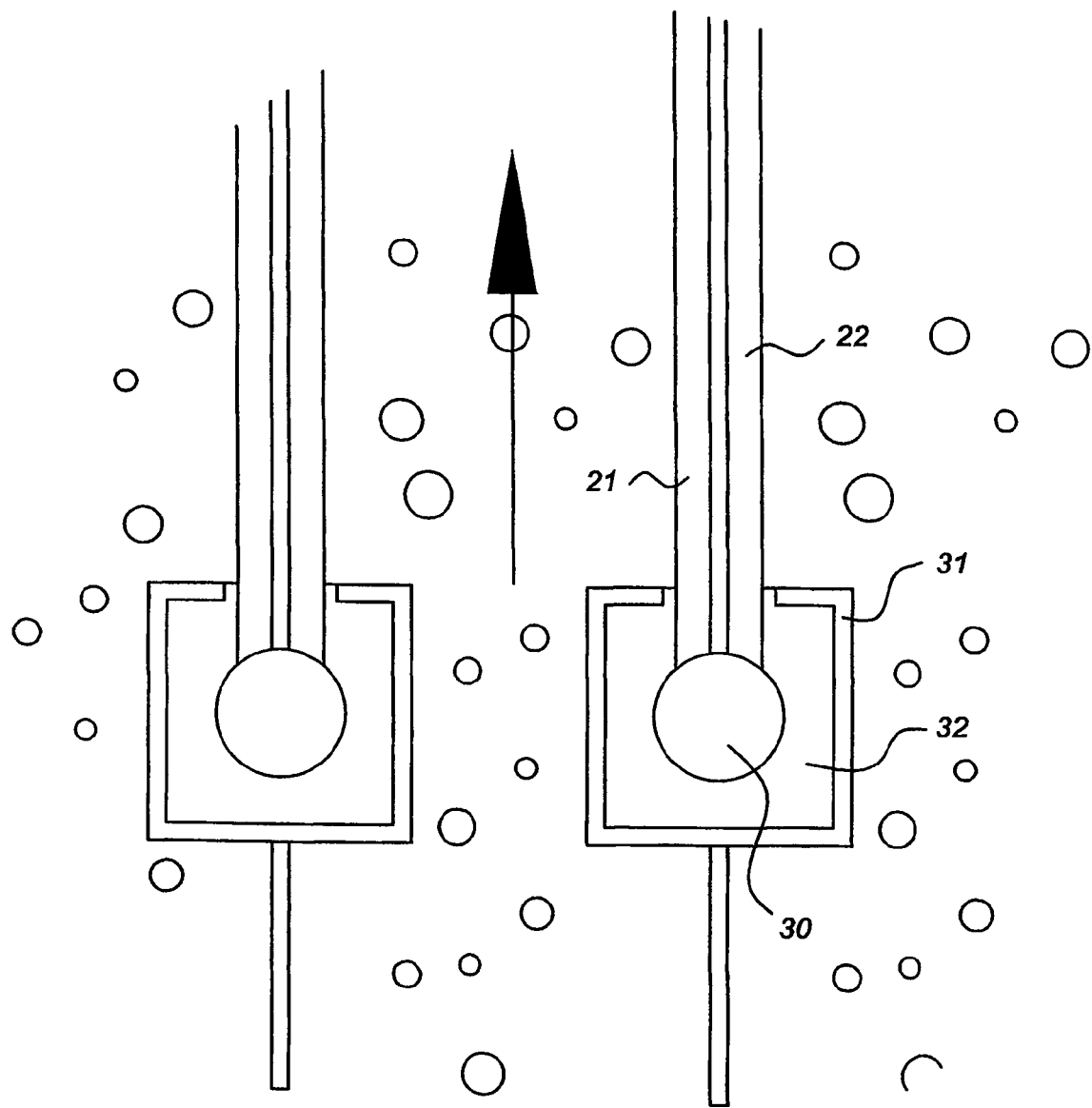
FIG. 4 shows a detail of the underside of the frame shown in FIG. 1.

FIG. 1 shows a front view of a frame 1 in which a plurality of sets of membrane cloths are positioned. The frame 1 comprises a substantially horizontally running top wall 3, a bottom wall 4 and two side walls 5. A specific means of mounting the membrane cloths 2 is shown in FIG. 4.

The frame 1 as shown in FIG. 1 is positioned in a membrane bioreactor. A stream of bubbles is used to bring about a flow of fluid between the membrane cloths. The stream of bubbles ensures that the fluid along the surface of the membranes is constantly refreshed. A vacuum is generated between the membrane cloths, with the aid of a pump. This vacuum causes part of the flow of fluid to be sucked into the membrane cloths. On account of the particular shape of the membrane cloths according to the invention, there are small channels between the membrane cloths in order to discharge the water which is sucked through the cloths. The stream of bubbles which will pass upward from beneath the frame 1 causes the membrane cloths to vibrate and shear forces to be produced on the surface of the cloths. As a result, it is impossible for impurities to adhere to the outer surface of the membrane material.

Figure 2:
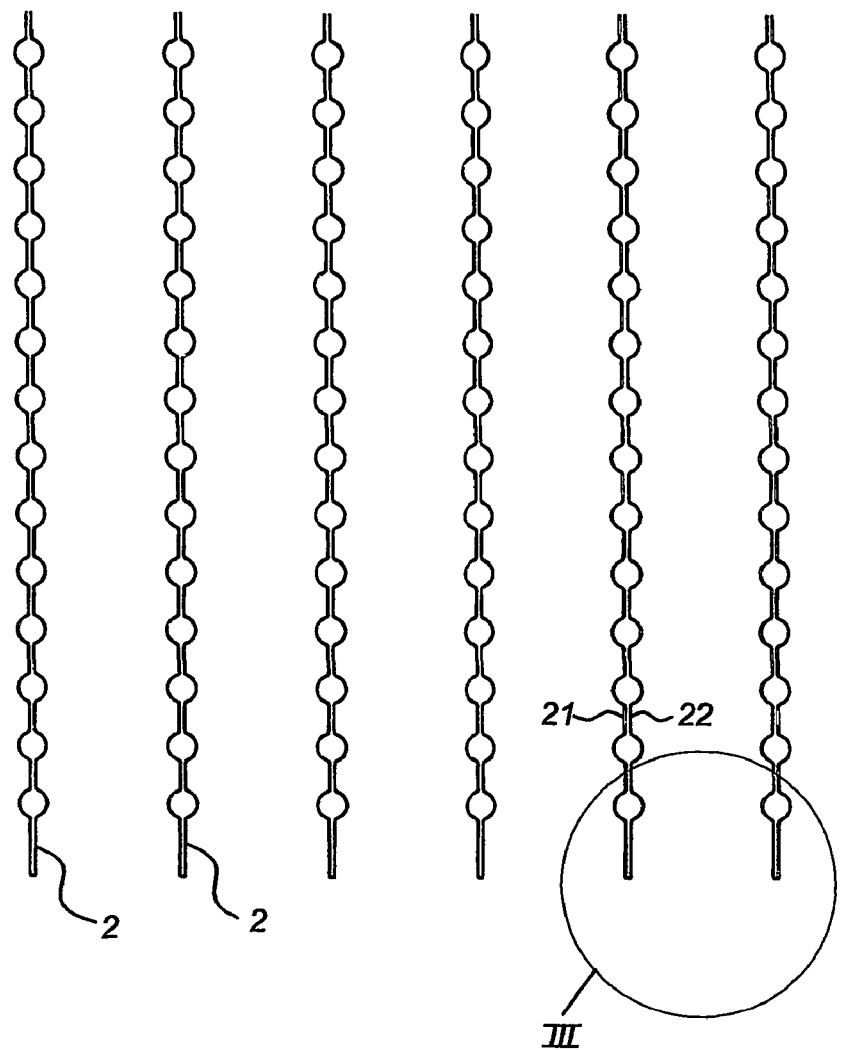
FIG. 2 shows a plan view of part of FIG. 1, in section on line A—A.
Figure 3:
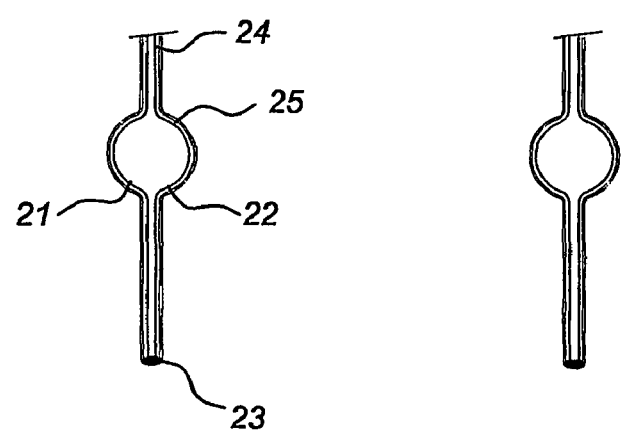
FIG. 3 shows a detail as indicated by III in FIG. 2.

FIG. 2 shows a plan view of part of FIG. 1, in section on line A—A. It can be seen from FIG. 2 that each set of membrane cloths 2 comprises a first membrane cloth 21 and a second membrane cloth 22. Membrane cloth 21 is always shown on the left-hand side in FIG. 2, while a second membrane cloth 22 is situated on the right-hand side. A further detail of the membrane cloths 21, 22 is shown in FIG. 3. It can be seen from FIG. 3 that the end edge of the first membrane cloth 21 adjoins the end edge of the second membrane cloth 22. In the vicinity of their ends, the cloths 21, 22 are connected by a connection member or weld 23. It is also possible for the first membrane cloth 21 and the second membrane cloth 22 to be formed as a first part and a second part of a single filtration member. The membrane cloths 21, 22 are composed, for example, of a base layer of polyester fibre 24, to the outer side of which a top layer of polysulphone has been applied. The polyester fibre layer is, for example, 0.5 millimeter thick, while the top layer is, for example, 0.25 millimeter thick.

The base layer of polyester fibre ensures good transfer of water through the membrane cloth. The top layer of polysulphone ensures that microorganisms are separated out of the water drawn through the membrane. The membrane cloths 21, 22 are secured in a gutter 31 with the aid of a compound, such as a moulding compound 32. Then, a recess or bore 30 is made in this moulding compound 32. As will be discussed below with reference to FIG. 6, the extension of this bore 30 is connected to a central manifold. On the top side of the membranes (not shown), there may be a corresponding gutter with a corresponding bore. The extension of this bore will be connected to the discharge line for the purified water.

The position of the cloths 21, 22 as shown in FIGS. 2 and 3 corresponds to the position which the cloths adopt when a vacuum is applied between the cloths. As a result of the vacuum, the mutually facing sides of the cloths 21, 22 move substantially towards one another. In the present text, this position is also referred to as the "first position". This position is used to clean a flow of fluid, such as for example wastewater, with the aid of the membrane cloths 21, 22.

FIG. 4 shows a further detail of the way in which the membrane cloths 21, 22 are secured at the underside of the frame 1.

It is advantageous for the moulding compound 32 to be made from the same or substantially the same material as the membrane cloths 21, 22. In the present case, this means that the moulding compound 32 consists of a polyester. This measure ensures good adhesion of the membrane cloths 21, 22 to the compound 32. The duct or gutter 31 is preferably made from a material such as stainless steel.

Figure 5:
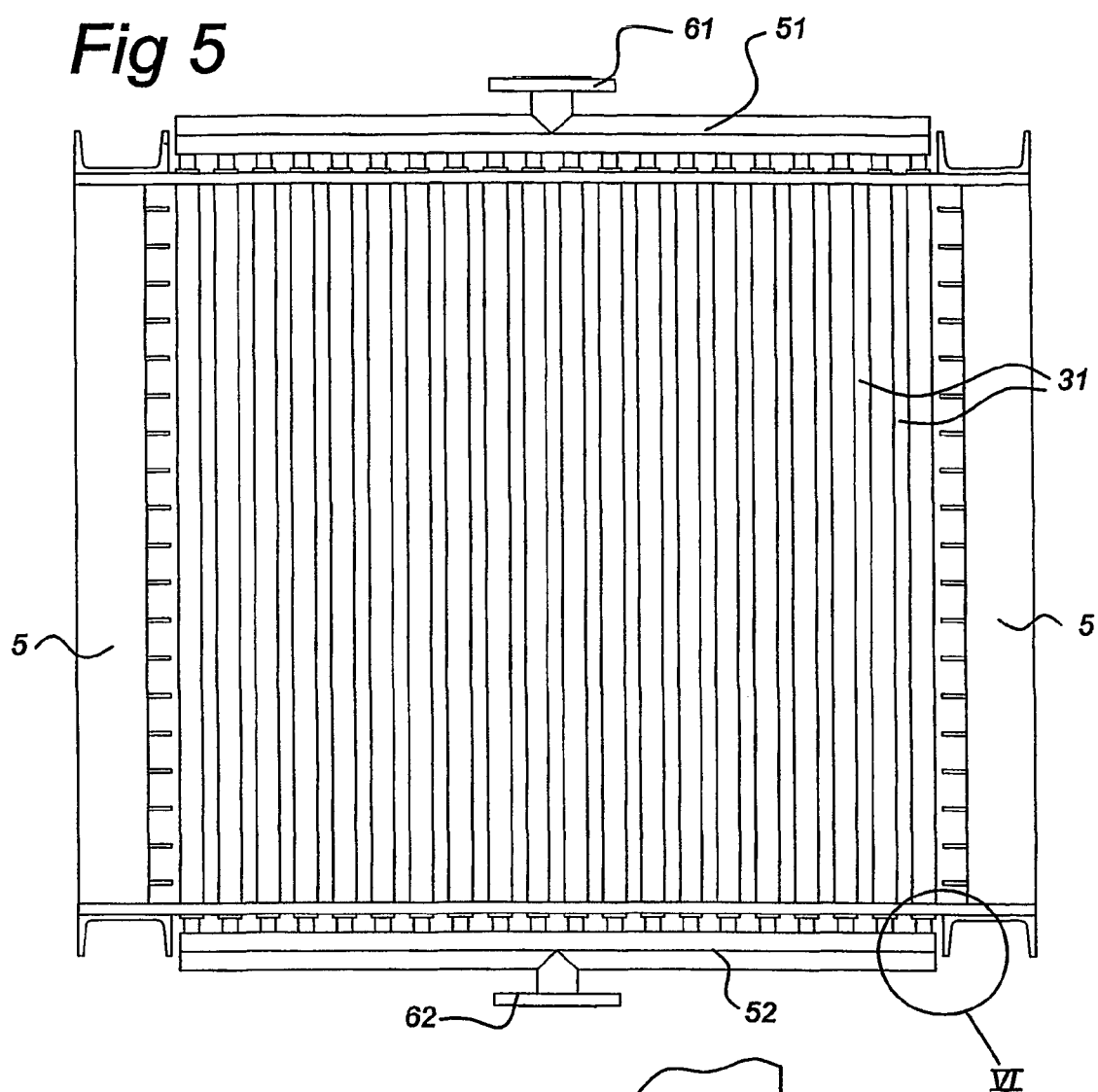
FIG. 5 shows a plan view of the device shown in FIG. 1.

FIG. 5 shows a plan view of the device illustrated in FIG. 1.

It can be seen from FIG. 5 that the various gutters 31, at the top of the membranes, are connected to manifolds 51, 52 via extension pieces. These manifolds 51, 52 are connected via a central connection 61, 62 to, for example, a pump, in order to ensure that the purified water removed from the device is discharged. FIG. 5 also shows the side walls 5 which have to be present in order to prevent the membrane cloths (cannot be seen in the plan view) from moving excessively far apart when an excess pressure is applied between the membrane cloths.

Figure 6:
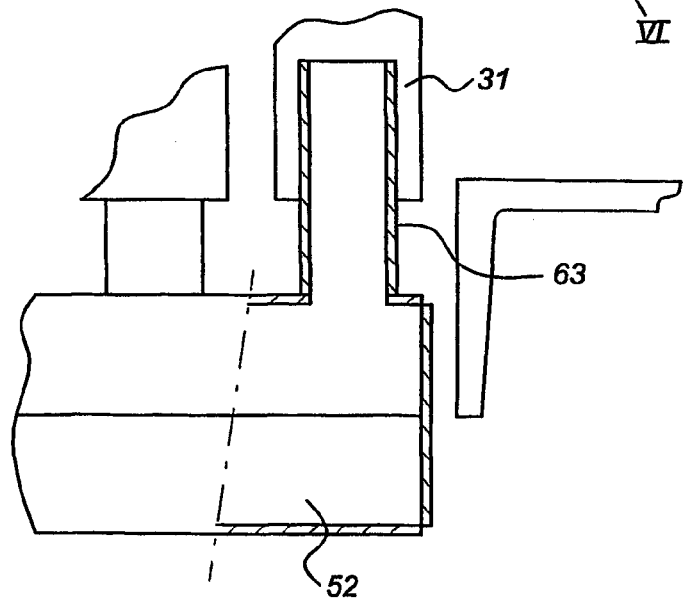
FIG. 6 shows a further detail of part of the device shown in FIG. 5.

FIG. 6 shows a detail indicated by VI in FIG. 5. It can be seen from this figure that each of the gutters 31 is connected to the manifold 52 via a connection 63. It is clear that the respective gutter 31, at its other end is connected to the central manifold 51 with the end of a corresponding connection.

FIG. 7 once again shows a plan view of the cloths 21, 22 on section line A—A in FIG. 1. However, in FIG. 7 there is an excess pressure between the cloths 21, 22. This situation arises if it is desired to clean the cloths 21, 22 with the aid of a cleaning liquid which is applied under pressure between the cloths 21, 22. This pressure may rise, for example, to 0.5 meter water column. On account of the excess pressure which is produced between the membrane cloths 21, 22, the distance between the two cloths will increase, so that the resistance which the flow of fluid undergoes will be lower and the cleaning liquid can also pass deep into the recesses 25.

Figure 7:
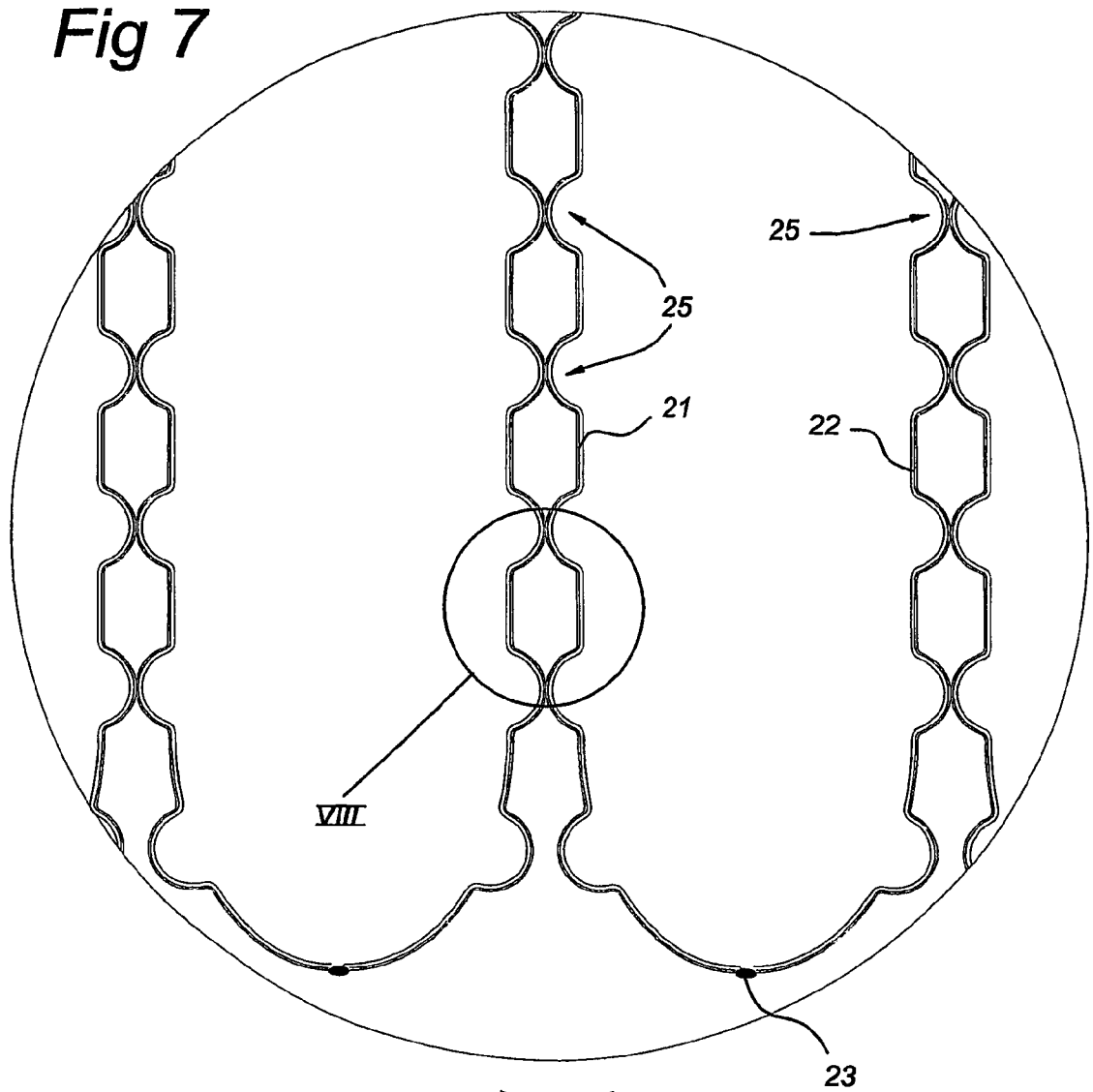
FIG. 7 shows the position of the cloths at the time at which an excess pressure is being created between the cloths.
Figure 8:
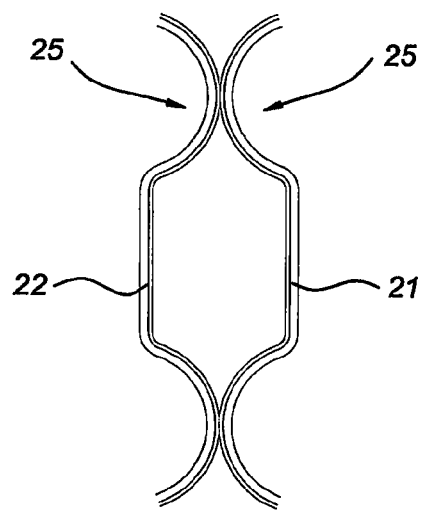
FIG. 8 shows a detail of the cloths shown in FIG. 7.

A further detail of the position illustrated in FIG. 7 is shown in FIG. 8. It can be seen from FIG. 8 that if the cloths 21, 22 are secured mirror-symmetrically in the frame 1, in the position shown in FIG. 7 the rear side of the channels 25 rest against one another.

For the sake of clarity, it should be noted that the position of the membrane cloths 21, 22 which is shown in FIGS. 7 and 8 is also referred to as the "second position" in the present text.

The invention claimed is:

1. Device, in particular suitable for cleaning a fluid, such as water, comprising at least one set of a first membrane cloth and a second membrane cloth, each being permeable to water over substantially their entire length, which membrane cloths are held taut in their longitudinal direction, substantially parallel to one another in a frame, the membrane cloths between them delimiting a movement path for fluid, the cloths being displaceable with respect to one another between a first position in which the mutually facing surfaces substantially touch one another, and a second position, in which the cloths lie at a distance from one another and the width of the movement path for the fluid is greater than in the first position, wherein at least one of the cloths, on the side which faces the adjacent cloth, is provided with grooves or webs for the purpose of forming channels between the cloths, in the first position of the membrane cloths, characterised in that, the grooves or webs and channels formed by the grooves or webs, respectively, extend in the longitudinal direction of the membrane cloths and in that vacuum means are provided for generating a vacuum between the cloths, via a manifold, wherein the grooves or webs, respectively, extend in the direction of the manifold.

2. Device according to claim 1, characterized in that the grooves or webs are formed by ribs which extend in the longitudinal direction of the cloth.

3. Device according to claim 1, characterized in that grooves or webs are arranged in both the first membrane cloth and the second membrane cloth, the grooves or webs of the cloths being positioned in such a manner that the grooves in the first cloth together with the grooves in the second cloth enclose a channel between the cloths, in the first position of the membrane cloths.

4. Device according to claim 1, characterized in that the first membrane cloth is a first part of a filter body, the second cloth being a second part of the filter body.

5. Device according to claim 1, characterized in that the membrane cloths comprise polyester fibre.

6. Device according to claim 5, characterized in that the polyester fibre is coated with a top layer of polysulphone.

7. Device according to claim 1, characterized in that the end edges of the membrane cloths are clamped inside a gutter filled with a mass of material which substantially corresponds to the material of the membrane cloth.

8. Device according to claim 1, characterized in that in the vicinity of the underside of the membrane cloths there are means for forming a stream of bubbles along the membrane cloths.

9. Device according to claim 2, characterized in that grooves or webs are arranged in both the first membrane cloth and the second membrane cloth, the grooves or webs of the cloths being positioned in such a manner that the grooves in the first cloth together with the grooves in the second cloth enclose a channel between the cloths, in the first position of the membrane cloths.

10. Device, in particular suitable for cleaning a fluid, such as water, comprising at least one set of a first membrane cloth and a second membrane cloth, each being permeable to water over substantially their entire length, which membrane cloths are held taut in their longitudinal direction, substantially parallel to one another in a frame having an underside and a top side, the membrane cloths between them delimiting a movement path for fluid, the cloths being displaceable with respect to one another between a first position, in which the mutually facing surfaces of said cloths substantially touch one another, and a second position, in which said mutually facing surfaces of said cloths lie at a distance from one another such that, in the second position the movement path for the fluid has a width which is greater than in the first position, wherein at least the first cloth, on the side which faces towards the second cloth, is provided with grooves or webs for the purpose of forming channels between the cloths, in the first position of the membrane cloths, characterized in that, the channels formed by the grooves or webs, respectively, extend in the longitudinal direction of the membrane cloths and in that a pump is provided for generating a vacuum between the cloths, and in that the membrane cloths are secured in gutters at the underside and the top side of the frame, wherein the grooves or webs, respectively, extend in the direction of the gutters at the underside and top side of the frame.

11. Device according to claim 10, characterized in that the grooves or webs, respectively, are formed by ribs which extend in the longitudinal direction of the cloth.

12. Device according to claim 10, characterized in that the grooves or webs are arranged in both the first membrane cloth and the second membrane cloth, the grooves or webs, respectively, of the cloths being positioned in such a manner that the grooves or webs, respectively, in the first cloth together with the grooves or webs, respectively, in the second cloth enclose a channel between the cloths, in the first position of the membrane cloths.

13. Device according to claim 10, characterized in that the first membrane cloth is a first part of a filter body, the second cloth being a second part of the filter body.

14. Device according to claim 10, characterized in that the membrane cloths comprise polyester fiber as substrate material.

15. Device according to claim 14, characterized in that the substrate material is coated with a top layer of polysulphone.

16. Device according to claim 13, characterized in that the end edges of the membrane cloths are clamped inside said gutters, which are filled with a mass of material which substantially corresponds to the material of the membrane cloth.

17. Device according to claim 10, characterized in that in the vicinity of the underside of the membrane cloths there are means for forming a stream of bubbles along the membrane cloths.

18. Device according to claim 11, characterized in that the grooves or webs are arranged in both the first membrane cloth and the second membrane cloth, the grooves or webs, respectively, of the cloths being positioned in such a manner that the grooves or webs, respectively, in the first cloth together with the grooves or webs, respectively, in the second cloth enclose a channel between the cloths, in the first position of the membrane cloths.

19. Method for the biological cleaning of wastewater, in which a) a device is used that comprises at least one set of a first membrane cloth and a second membrane cloth, each being permeable to water over substantially their entire length, which membrane cloths are held taut in their longitudinal direction, substantially parallel to one another in a frame having an underside and a top side, the membrane cloths between them delimiting a movement path for fluid, the cloths being displaceable with respect to one another between a first position, in which the mutually facing surfaces of said cloths substantially touch one another, and a second position, in which said mutually facing surfaces of said cloths lie at a distance from one another such that, in the second position the movement path for the fluid has a width which is greater than in the first position, wherein at least the first cloth, on the side which faces towards the second cloth, is provided with grooves or webs for the purpose of forming channels between the cloths, in the first position of the membrane cloths, characterized in that, the channels formed by the grooves or webs, respectively, extend in the longitudinal direction of the membrane cloths and in that a pump is provided for generating a vacuum between the cloths, and in that the membrane cloths are secured in gutters at the underside and the top side of the frame, wherein the grooves or webs, respectively, extend in the direction of the gutters at the underside and top side of the frame, b) the wastewater is purified with the aid of microorganisms which are present in an aerated tank, and c) the purified water is passed along the first and second membrane cloth, for the purpose of separating particles, such as microorganisms, out of the purified water, the purified water being forced through a fluid path with the aid of a vacuum, which fluid path is enclosed between a first membrane cloth and a second membrane cloth, characterized in that the first membrane cloth and the second membrane cloth are arranged displaceably with respect to one another, in such a manner that the first membrane cloth and the second membrane cloth are moved substantially towards one another by sucking up water between the membrane cloths.

20. Method according to claim 19, characterized in that when with the aid of an excess pressure, a cleaning liquid is forced through the fluid path between the first and second membrane cloths.

* * * * *